UNITED STATES PATENT OFFICE.

LUCIEN P. BASSET, OF MONTMORENCY, FRANCE.

PROCESS OF MANUFACTURING CEMENT OR HYDRAULIC LIME FROM CALCIUM SULFATE.

1,198,816.  Specification of Letters Patent.  Patented Sept. 19, 1916.

No Drawing.   Application filed December 17, 1912.   Serial No. 737,331.

*To all whom it may concern:*

Be it known that I, LUCIEN P. BASSET, a citizen of the French Republic, and resident at Montmorency, France, have invented certain new and useful Improvements in Processes of Manufacturing Cement or Hydraulic Lime from Calcium Sulfate.

The present invention has for its object a process of manufacturing cement or hydraulic lime, based upon the decomposition of sulfate of lime by clay at a high temperature.

This invention also comprehends improvements and variations over applications for patents filed by me on Nov. 25, 1913, Serial No. 803,004, and March 4, 1914, Serial No. 822,289.

This invention differs from application No. 803,004 in that while the present invention aims to accomplish the manufacture of cement by a process which takes place in two steps: first, by heating a mixture of calcium sulfate, clay and carboniferous materials in such proportions that an intermediary acid compound is formed, then, second, by adding calcareous materials to the above named acid compound, and heating this mixture, whereby the basic compound is formed, which is cement. Application No. 803,004 accomplishes the manufacture of cement by a process which includes one step only, and the said application is further differentiated in that an excess of calcium sulfate is employed, while in the present invention, an excess of clay is employed.

This invention is further differentiated from application No. 822,289 in that the said application describes a process wherein the excess of calcium sulfate occurring during the operation of the process is treated with an excess of calcium sulfid, and the calcium sulfid is ultimately destroyed by oxidation.

If calcium sulfate and clay were simply placed together as the sulfate of lime is very fixed, it would require a great quantity of combustible to be decomposed: further, the reaction would take place slowly and would not be complete.

The new process has for its object to facilitate the decomposition of calcium sulfate and to render it rapid and complete.

This process consists essentially in adding coal or charcoal to the mixture of calcium sulfate and clay, and in causing steam to act upon this mixture. The decomposition of the pure calcium sulfate requires, theoretically, and in making the abstraction by the action of clay, 118.8 calories per gram. By the addition of coal or charcoal the stability of the sulfate is diminished. If the quantity of coal or charcoal is that necessary to convert the calcium sulfate into sulfite, the quantity of heat is reduced to 61.8. The decomposition of calcium sulfate is thus facilitated nevertheless it would not be comparable to that of calcium carbonate, which only requires 43.4 calories. It is possible to make it quite as easy, by adding more coal or charcoal than is necessary, to transform the sulfate into sulfite. With 10% of coal or charcoal, the decomposition takes place at about the same temperature as that of calcium carbonate.

The steam assists considerably the decomposition of the calcium sulfate. This result is due to the fact that it permits the formation of hydrogen by the dissociation of sulfureted hydrogen, taking place in the reaction of the steam upon the calcium sulfid, this latter being produced by the reduction of the sulfate by coal or charcoal in the presence of steam upon the coal or charcoal. The hydrogen thus liberated, due to its physical state has a reducing power with respect to calcium sulfate much above that of sulfid of calcium or coal or charcoal. Further, steam has the advantage of acting directly upon the calcium sulfate, in the presence of clay without causing intermediate reactions. Owing to the steam, the decomposition of calcium sulfate is rapid and complete, and by operating in an atmosphere distinctly oxidizing, there does not remain a trace of sulfid of calcium.

As the first materials do not generally contain iron, a small quantity of oxid of iron, about 2%, is preferably added. This oxid has a double purpose; it, in the first place, facilitates the reaction, in the second place, it acts as a flux and changes to a state of ferrite of calcium which is an element in cement.

In carrying the present invention into effect, an intimate mixture is made of calcium sulfate, clay, coal or charcoal, and oxid of iron, if necessary, in convenient proportions the proportion of clay used should exceed that of calcium sulfate. This mixture, either dry or in the condition of mud, is passed into a furnace, preferably a rotary furnace, which enables the state of the products of combustion to be easily regulated; all furnaces capable of satisfying these conditions will be suitable. In case a rotary furnace is not being employed, it would be necessary to put the mixture into the form of briquets.

The steam necessary for the reaction may be introduced into the furnace in several manners: it may be introduced in the form of steam, superheated or not, or it may be produced during the combustion of a gas containing hydrogen, as the gases of gasogenes (generators or producers) water gas or crude petroleum, or fatty combustible matter containing a large quantity of volatile matter, that is to say, rich in hydrogen. The mixture burned under these conditions furnishes upon crushing, cement or hydraulic lime, practically pure.

This method of carrying the invention into effect is characterized by the fact, that the reaction takes place in two steps: in the first, the plaster is treated with an excess of clay under the conditions already indicated; thanks to the predominance of the acid element, the reaction is very rapid and complete. In the second step, a certain quantity of limestone is added to reëstablish the theoretic proportions corresponding to the nature of hydraulic lime or cement which it is desired to obtain; the silico aluminate of lime obtained by the first step is brought back to the desired basic condition. The mixture is submitted to heat under ordinary conditions, either in a blast furnace or in a rotary furnace.

This method of operating has the advantage of furnishing, owing to the small quantity of coal or charcoal consumed, very concentrated sulfurous gases.

The invention enables flowers of sulfur, for example, to be obtained instead of sulfurous anhydrid. For this purpose it is necessary to increase the quantity of coal or charcoal employed so as to transform into sulfid three quarters of the calcium sulfate present. The following reaction takes place:

$$3CaS + CaSO_4 = 4CaO + 4S$$

The lime liberated combines with the elements of the clay to produce cement or hydraulic lime according to the relative quantities of lime and clay.

In practice to realize the above reaction, it is necessary to work in an atmosphere neither oxidizing nor reducing so as to prevent the combustion of sulfur and the formation of oxisulfid of carbon.

As a modification in the method of carrying the process into effect, sulfid of calcium produced by a special operation may be added to a mixture, in convenient proportions, of $CaSO_4$ and clay. After intimately mixing, it is calcined in a neutral atmosphere in any suitable kind of furnace, blast, rotary or muffle.

The sulfur which escapes from the furnace is condensed by the usual method and the calcareous residue or lime, is ground and put into bags.

The invention is not limited to the manner of carrying it into effect above described; all the details of execution and application may, according to circumstances, be varied without changing the principle of the invention.

Throughout this specification the words "plaster of Paris" are everywhere used as meaning crude gypsum (calcium sulfate) $CaSO_4$.

It has been described above that the process may be carried into effect in two successive steps; in the first step, the plaster or gypsum is treated by an excess of clay whereby silico-aluminate of calcium is formed; in the second step lime or calcareous material is added to the silico-aluminate of calcium, when the latter combines with the lime of the calcareous material to form cement or hydraulic lime. In this method of operating the materials are submitted to two successive burnings, preferably in two distinct furnaces.

Now in order to accurately mix the materials intended to enter into reaction, that is, plaster, clay and coal, said materials are preferably crushed. If the materials are crushed under water, the mud obtained will generally contain 40% of water. This proportion of water is too high, particularly if the sulfurous acid formed is to be converted to sulfuric acid; this quantity of water would objectionably dilute the sulfuric acid in the chambers. Therefore it will be advantageous to vaporize a portion of the water. One improvement of the present addition consists in utilizing the heat of the waste gases of the second furnace to this end, in which furnace lime combines with the silico-aluminate produced in the first furnace. This operation may be carried out in any suitable apparatus.

If the materials are crushed in any state, the mixture will be introduced into the first furnace in a powdered state or in the state of paste, the mixture being slightly moistened to avoid the formation of dust. In any case, the mixture thus prepared is introduced into the upper end of the rotary furnace. The heating coal is introduced into the opposite end, in the form of powder blown into the furnace.

Owing to the rotation of the furnace, the mixture is slowly moved forward and decomposed. The sulfurous anhydrid produced will be drawn away by combustion gases, which must be oxidizing; the gaseous mixture will be brought into a lead lined chamber or any other suitable apparatus capable of converting same to sulfuric acid. The calcareous residue discharged from the furnace is formed of silico-aluminate of calcium, and basic alumina according to the excess of clay used. This material is friable and may be easily crushed if it has not been heated to the melting temperature. The silico-aluminate of calcium will be crushed or simply diluted and mixed with suitable proportions of calcareous materials to produce cement or hydraulic lime. Then the mixture will be calcined in a furnace, preferably a rotary furnace and the heat of the waste gases may be utilized for vaporizing the water contained in the mud of the first operation, as already described above.

Owing to the excess of clay, the decomposition of calcium sulfate in the first step of the process takes place very easily in a complete manner. If the process is thus operated in two steps, the presence of steam will be less important than if the process is carried out in a single step, and if desired the action of steam may be dispensed with.

Moreover the process of this invention enables slag cement to be produced under particularly advantageous conditions. In fact the silico-aluminate of calcium produced in the first step of the operation may be compared to slag of a blast-furnace except for its composition, which may be predetermined and contain no trace of sulfid of calcium. The silico-aluminate of calcium, melted or not melted, granulated or not granulated, will be finely divided and mixed with slaked lime. Thus it produces cement which is similar to slag cement, but purer. This method in two steps is also applicable in cases where sulfur instead of sulfurous anhydrid is to be produced. In the first step all that is necessary to do is to use an excess of coal for converting three quarters of the calcium sulfate present to sulfur, the calcination being effected in an atmosphere which is neither oxidizing nor reducing. The silico-aluminate of calcium is treated as before, that is mixed with slaked lime to produce slag cement, or again calcined with chalk or lime to produce hydraulic lime or cement. In order to carry into effect the first step, a suitable quantity of sulfid of calcium produced by a special operation may be added to calcium sulfate instead of coal.

I wish it to be understood that the details of the method of carrying into effect the improved process, the proportions of the materials in reaction and the like may be changed without departing from the scope of the invention.

I claim:

1. A process for manufacturing cement which consists in first heating a mixture of calcium sulfate, clay and carboniferous material in the presence of moisture whereby an intermediary acid compound is formed, then adding calcareous material and reheating to form a basic compound which is cement.

2. A process for manufacturing cement which consists in first heating a mixture of calcium sulfate and carboniferous material with an excess of clay in the presence of steam whereby a compound consisting mainly of acid calcium silicate and aluminate is formed, and finally mixing the last named compound with a proper proportion of calcareous material and reheating the mixture to form a basic calcium silicate and aluminate which is cement.

3. A process for manufacturing cement which consists in heating a mixture of calcium sulfate, coal and an excess of clay whereby an acid calcium silicate and aluminate is formed, then reheating the said compound with a proportion of lime sufficient to neutralize the acid character of the calcium silico-aluminate.

4. A process for manufacturing cement which consists in pulverizing under water a mixture of gypsum, coal and clay, whereby a mud consisting of the finely divided materials in suspension is formed, heating the mud by means of waste furnace gases to expel a portion of the water, heating the dried mud in a furnace whereby an acid slag is formed, and finally heating the slag in a second furnace with a proper proportion of lime to form the cement, the waste gases from the second furnace being utilized to expel the water from a second quantity of mud.

In testimony whereof I have hereunto set my hand in presence of two witnesses.

LUCIEN BASSET.

Witnesses:
 HANSON C. COXE,
 GEORGES BONNEUIL.